United States Patent
Barnes et al.

(10) Patent No.: US 9,537,420 B2
(45) Date of Patent: Jan. 3, 2017

(54) METHOD AND APPARATUS FOR POWER MODULE OUTPUT POWER REGULATION

(71) Applicant: Enphase Energy, Inc., Petaluma, CA (US)

(72) Inventors: Andrew Barnes, Santa Rosa, CA (US); Tibor Bolfan, Rohnert Park, CA (US)

(73) Assignee: Enphase Energy, Inc., Petaluma, CA (US)

( * ) Notice: Subject to any disclaimer, the term of this patent is extended or adjusted under 35 U.S.C. 154(b) by 991 days.

(21) Appl. No.: 13/623,302

(22) Filed: Sep. 20, 2012

(65) Prior Publication Data

US 2013/0070496 A1 Mar. 21, 2013

Related U.S. Application Data

(60) Provisional application No. 61/626,121, filed on Sep. 21, 2011.

(51) Int. Cl.
*H02M 3/335* (2006.01)
*H02M 7/48* (2007.01)
*H02J 3/38* (2006.01)

(52) U.S. Cl.
CPC .............. *H02M 7/48* (2013.01); *H02J 3/383* (2013.01); *H02J 3/382* (2013.01); *Y02E 10/563* (2013.01)

(58) Field of Classification Search
CPC .............. H02M 7/42; H02M 3/33507; H02M 2001/0032; H02M 7/48; H02J 3/382; H02J 3/383

USPC ........................ 363/44, 49, 95; 323/266, 901
See application file for complete search history.

(56) References Cited

U.S. PATENT DOCUMENTS 8,050,062 B2 * 11/2011 Wagoner et al. ............... 363/49
2011/0205773 A1 8/2011 Wagoner et al.

FOREIGN PATENT DOCUMENTS

EP 2256579 A1 12/2010
SU 1815628 A1 5/1993

OTHER PUBLICATIONS

International Search Report and Written Opinion mailed Dec. 20, 2012 for Application No. PCT/US2012/056319, 6 pgs.

* cited by examiner

*Primary Examiner* — Yemane Mehari
(74) *Attorney, Agent, or Firm* — Moser Taboada

(57) ABSTRACT

A method and apparatus for modifying power produced by a power converter. In one embodiment, the method comprises comparing a line voltage level to a first threshold and a second threshold, wherein the line voltage level is a level of a line voltage at an output of a power converter; and modifying power produced by the power converter by (i) a first modification when the line voltage level is between the first and the second thresholds, and (ii) a second modification when the line voltage level exceeds the second threshold.

20 Claims, 3 Drawing Sheets

METHOD AND APPARATUS FOR POWER MODULE OUTPUT POWER REGULATION

CROSS-REFERENCE TO RELATED APPLICATIONS

This application claims benefit of U.S. provisional patent application Ser. No. 61/626,121, filed Sep. 21, 2011, which is herein incorporated in its entirety by reference.

BACKGROUND OF THE INVENTION

Field of the Invention

Embodiments of the present disclosure relate generally to power conversion and, in particular, to regulating output power of a power conversion module.

Description of the Related Art

Solar panels, or photovoltaic (PV) modules, convert energy from sunlight received into direct current (DC). The PV modules cannot store the electrical energy they produce, so the energy must either be dispersed to an energy storage system, such as a battery or pumped hydroelectricity storage, or dispersed by a load. One option to use the energy produced is to employ one or more inverters to convert the DC current into an alternating current (AC) and couple the AC current to the commercial power grid. The power produced by such a distributed generator (DG) system can then be sold to the commercial power company.

In order to mitigate potential safety hazards, a DG coupled to a commercial power grid must be operated in accordance with relevant regulatory requirements, such as IEEE-1547. As part of meeting the IEEE-1547 requirements, an inverter within a grid-coupled DG must shut down under certain circumstances, such as line voltage operating outside of pre-defined limits.

In some DGs, inverters may be installed in a string configuration as part of power conditioning units (PCUs) coupled via an AC bus to the grid, where each PCU comprises a PV module coupled to an inverter. Based on wire gauge and distance from the grid, a voltage increase may be seen along the string, with the highest voltage level generally at the PCU farthest from the grid. As a result of such voltage increase along the string, utility voltage fluctuations that are within specifications as seen at the grid may result in a voltage at one or more of the inverters, in particular the inverters located at the far end of the string, that exceeds specifications and causes the impacted inverters to shut down for a required time period. Further, in an inverter that uses a mechanical relay for isolation from the AC bus, the relay will open. As the impacted inverters cease power production and thereby cause the voltage along the string to drop, the inverters may reactivate, begin producing power and couple such power to the grid by closing the corresponding relay, resulting in a continued oscillation that negatively impacts power production as well as causes relay "chatter" that potentially shortens the life of the inverter isolation relay.

Therefore, there is a need for a method and apparatus for efficiently regulating output power from a power conversion module.

SUMMARY OF THE INVENTION

Embodiments of the present invention generally relate to a method and apparatus for regulating power production. In one embodiment, the method comprises comparing a line voltage level to a first threshold and a second threshold, wherein the line voltage level is a level of a line voltage at an output of a power converter; and modifying power produced by the power converter by (i) a first modification when the line voltage level is between the first and the second thresholds, and (ii) a second modification when the line voltage level exceeds the second threshold.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
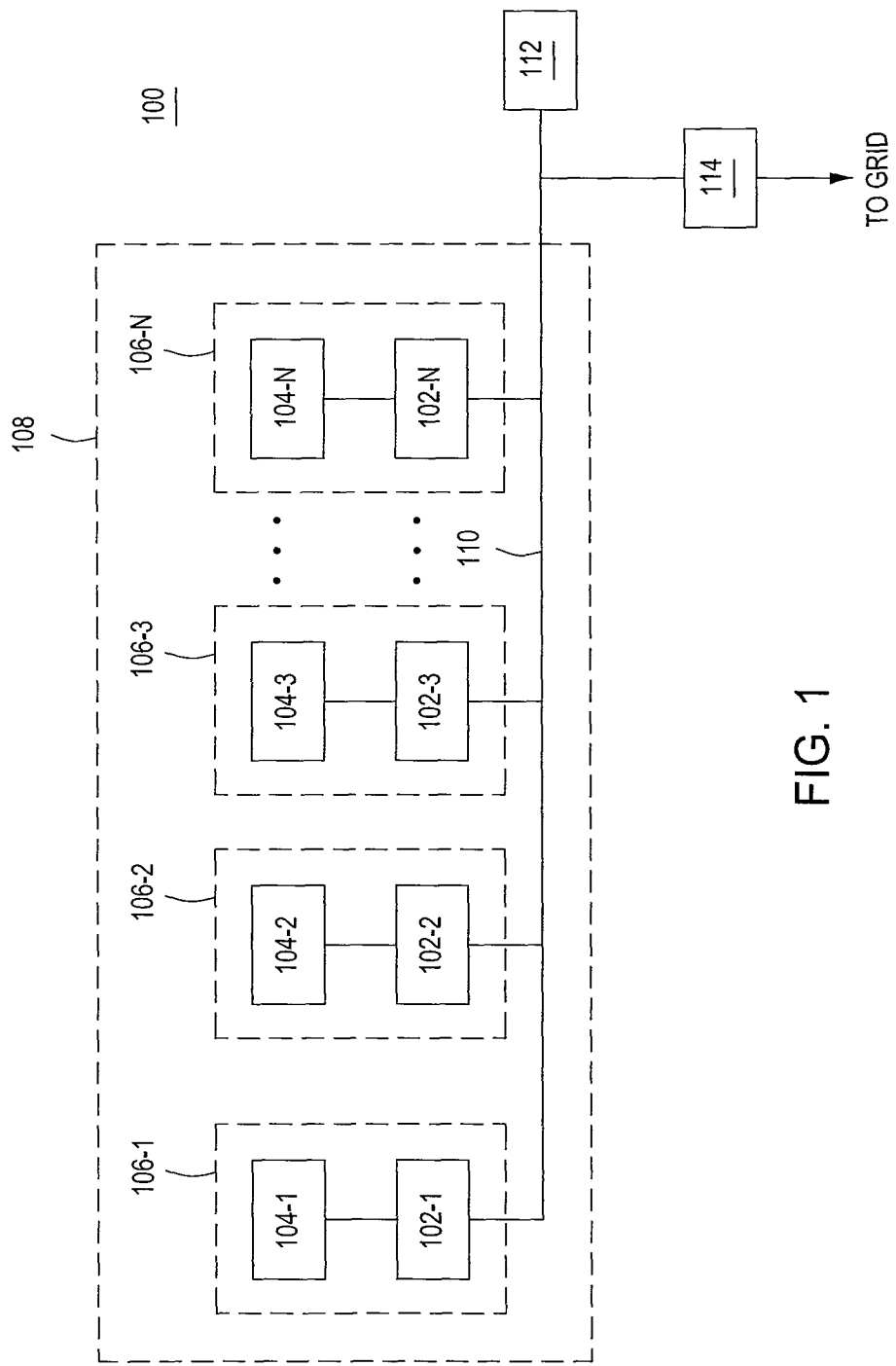
FIG. 1 is a block diagram of a distributed generator (DG) system in accordance with one or more embodiments of the present invention.

FIG. 1 is a block diagram of a distributed generator (DG) system 100 in accordance with one or more embodiments of the present invention. This diagram only portrays one variation of the myriad of possible system configurations. The present invention can function in a variety of distributed power generation environments and systems.

The DG system 100 ("system 100") comprises a plurality of inverters 102-1, 102-2 ... 102-n, collectively referred to as inverters 102 (or power converters 102), a plurality of PV modules 104-1, 104-2 ... 104-n, collectively referred to as PV modules 104, an AC bus 110, and a load center 114.

Each inverter 102-1, 102-2, 102-3, ... 102-n is coupled to a PV module 104-1, 104-2, 104-3, ... 104-n, respectively, in a one-to-one correspondence. In some embodiments, a DC-DC converter may be coupled between each PV module 104 and each inverter 102 (e.g., one DC-DC converter per PV module 104). Alternatively, multiple PV modules 104 may be coupled to a single inverter 102 (i.e., a centralized inverter); in some such embodiments, a DC-DC converter may be coupled between the PV modules 104 and the centralized inverter.

The inverters 102 are coupled to the AC bus 110, which in turn is coupled to the load center 114. The load center 114 houses connections between incoming power lines from a commercial power grid distribution system and the AC bus 110. Each PV module/inverter pair forms a power conditioning unit (PCU) 106 for generating AC power; e.g., PCU 106-1 comprises PV module 104-1 and inverter 102-1. For each PCU 106, the corresponding inverter 102 converts DC power from the coupled PV module 104 into AC power and meters out AC current that is in phase with the AC commercial power grid voltage.

The PCUs 106 form a string 108 and couple the generated AC power to the commercial power grid via the load center 114. Additionally or alternatively, the generated power may be coupled to appliances, and/or energy generated may be stored for later use; for example, the generated energy may be stored utilizing batteries, heated water, hydro pumping, H2O-to-hydrogen conversion, or the like. In some embodiments, one or more additional strings 108 may be present in the system 100 and/or the system 100 may comprise other types of renewable energy generators in addition to or in place of the PV modules 104, such as wind turbines, hydroelectric systems, or the like.

The system 100 further comprises a control module 112 coupled to the AC bus 110. The control module 112 is capable of issuing command and control signals to the inverters 102 in order to control the functionality of the inverters 102.

In accordance with one or more embodiments of the present invention, the inverters 102 each independently self-regulate their power production as the line voltage level at the inverters 102 approaches a predefined limit, such as a limit defined by relevant regulatory standards. When the line voltage at a particular inverter 102 reaches a first threshold, the inverter 102 maximum allowed power production is modified by a first modification; for example, the inverter 102 begins reducing its power production. The inverter 102 may continue to decrease power production as the line voltage rises until the line voltage at the inverter 102 reaches a second threshold; when the line voltage at the inverter output exceeds the second threshold, the inverter 102 maximum allowed power production is modified by a second modification. For example, the second threshold may be a regulatory limit, and when the line voltage at the inverter output exceeds such a limit the inverter 102 ceases power production altogether for a predetermined period of time. By operating in such a manner, the inverters 102 optimize power production for the string 108 without requiring any external communication. Additionally, for inverters 102 which contain a mechanical relay for isolation from the AC bus 110, relay chatter is prevented, thereby potentially extending the life of the inverter relay.

In some embodiments, an inverter 102 may linearly decrease its power production as the line voltage at the inverter 102 increases from the first threshold to the second threshold. In one exemplary embodiment where the power from the grid is a 240V split-phase supply, an inverter 102 may linearly decrease its power production from 100% to 75% as the line voltage at the inverter 102 rises from 263V to 264.2V, respectively. If the line voltage at the inverter 102 rises above 264.2V, the inverter 102 then shuts down power production for a predetermined period of time, such as five minutes. In other embodiments, the inverter power production may be decreased between the first and second thresholds in accordance with a function other than a linear ramp, such as a step function, an exponential function, a function controlled by a minimum power output level, or the like. Additionally or alternatively, a different value may be utilized for the first and/or second threshold, and/or the inverter power production output may be reduced to a different minimum level at the second threshold prior to complete power shut down.

In some alternative embodiments, the present invention may be utilized in regulating output power from other types of power conversion modules, such as DC/DC converters.

Figure 2:
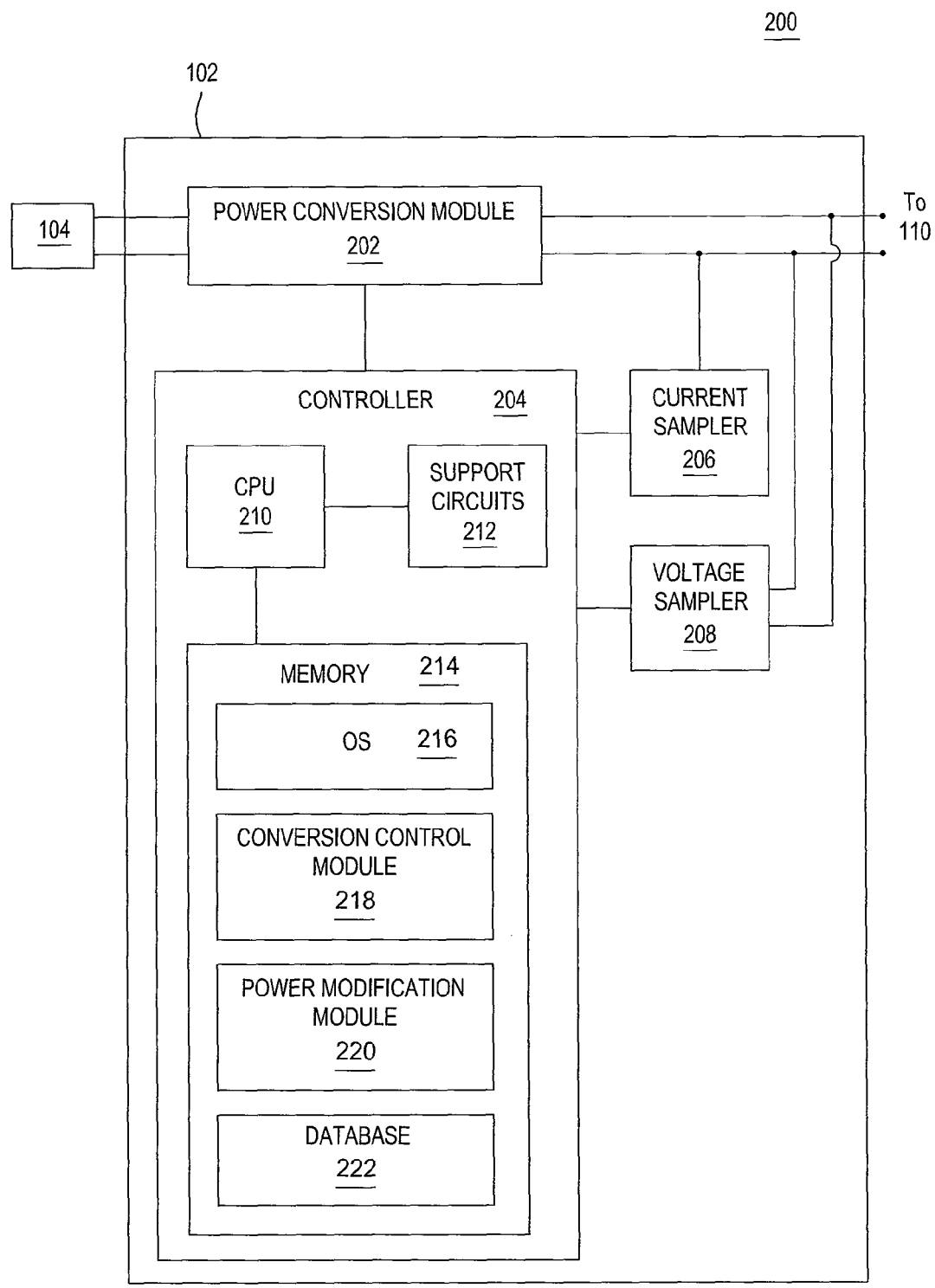
FIG. 2 is a block diagram of an inverter in accordance with one or more embodiments of the present invention.

FIG. 2 is a block diagram of an inverter 102 in accordance with one or more embodiments of the present invention. The inverter 102 comprises a power conversion module 202, a controller 204, a current sampler 206, and a voltage sampler 208.

The power conversion module 202 is coupled to the PV module 104 and the controller 204 and converts DC current from the PV module 104 to AC output current as controlled by the controller 204. The current sampler 206 is coupled to an output terminal of the power conversion module 202, and the voltage sampler 208 is coupled across both output terminals of the power conversion module 202. The current sampler 206 and the voltage sampler 208 obtain samples (i.e., measurements) of the AC current and AC voltage, respectively, at the output of the power conversion module 202 and provide such samples to the controller 204. The controller 204 may use the current and voltage samples for determining output current from the inverter 102, output voltage from the inverter 102, output power from the inverter 102, and the like. The current sampler 206 and the voltage sampler 208 may obtain such samples at a rate of 60 Hz; in some alternative embodiments, current and/or voltage samples may be obtained at other rates. The current sampler 206 and the voltage sampler 208 may each comprise an ND converter for obtaining the current and voltage samples, respectively.

The controller 204 may be comprised of hardware, software, or a combination thereof, and comprises at least one central processing unit (CPU) 210 coupled to support circuits 212 and memory 214. The CPU 210 may comprise one or more conventionally available microprocessors, microcontrollers and the like, which are capable of performing the processing described herein; in some embodiments, the CPU 210 may be a microcontroller comprising internal memory for storing controller firmware that, when executed, provides the functionality described below with respect to FIG. 3. Alternatively, the CPU 210 may include one or more application specific integrated circuits (ASICs). The support circuits 212 are well known circuits used to promote functionality of the CPU 210. Such circuits include, but are not limited to, a cache, power supplies, clock circuits, buses, network cards, input/output (I/O) circuits, and the like. The controller 204 may be implemented using a general purpose computer that, when executing particular software, becomes a specific purpose computer for performing various embodiments of the present invention.

The memory 214 may comprise random access memory, read only memory, removable disk memory, flash memory, and various combinations of these types of memory. The memory 214 is sometimes referred to as main memory and may, in part, be used as cache memory or buffer memory. The memory 214 generally stores the operating system (OS) 216 of the controller 204. The OS 216 may be one of a number of commercially available OSs such as, but not limited to, Linux, Real-Time Operating System (RTOS), and the like.

The memory 214 may store various forms of application software, such as a conversion control module 218 for providing operative control of the power conversion module 202 and driving the power conversion module 202 to inject the generated AC current in phase with the grid as required by the relevant standards.

The memory 214 further stores a power modification module 220 for regulating the inverter power production based on the line voltage level as determined by the voltage samples from the voltage sampler 208. The power modification module 220 compares the determined line voltage level to first and second thresholds and causes the power conversion module 202 to begin reducing its power output when the line voltage level exceeds the first threshold. If the line voltage level exceeds the second threshold, the power modification module 220 causes the power conversion module 202 to cease power production for a predetermined period of time. Functionality provided by the power modification module 220 is described below with respect to FIG. 3.

The memory 214 further stores a database 222 for storing data, such as data related to operating the power conversion module 202 as well as data regulating the inverter power production in accordance with the present invention. Such data may include the first and second thresholds, one or more functions (e.g., a linear ramp function, a function controlled by a minimum power output level, and the like) for determining a modified inverter power output, predetermined values for decreasing and/or increasing power production, a time period for the inverter to remain off following shutdown, and the like.

Figure 3:
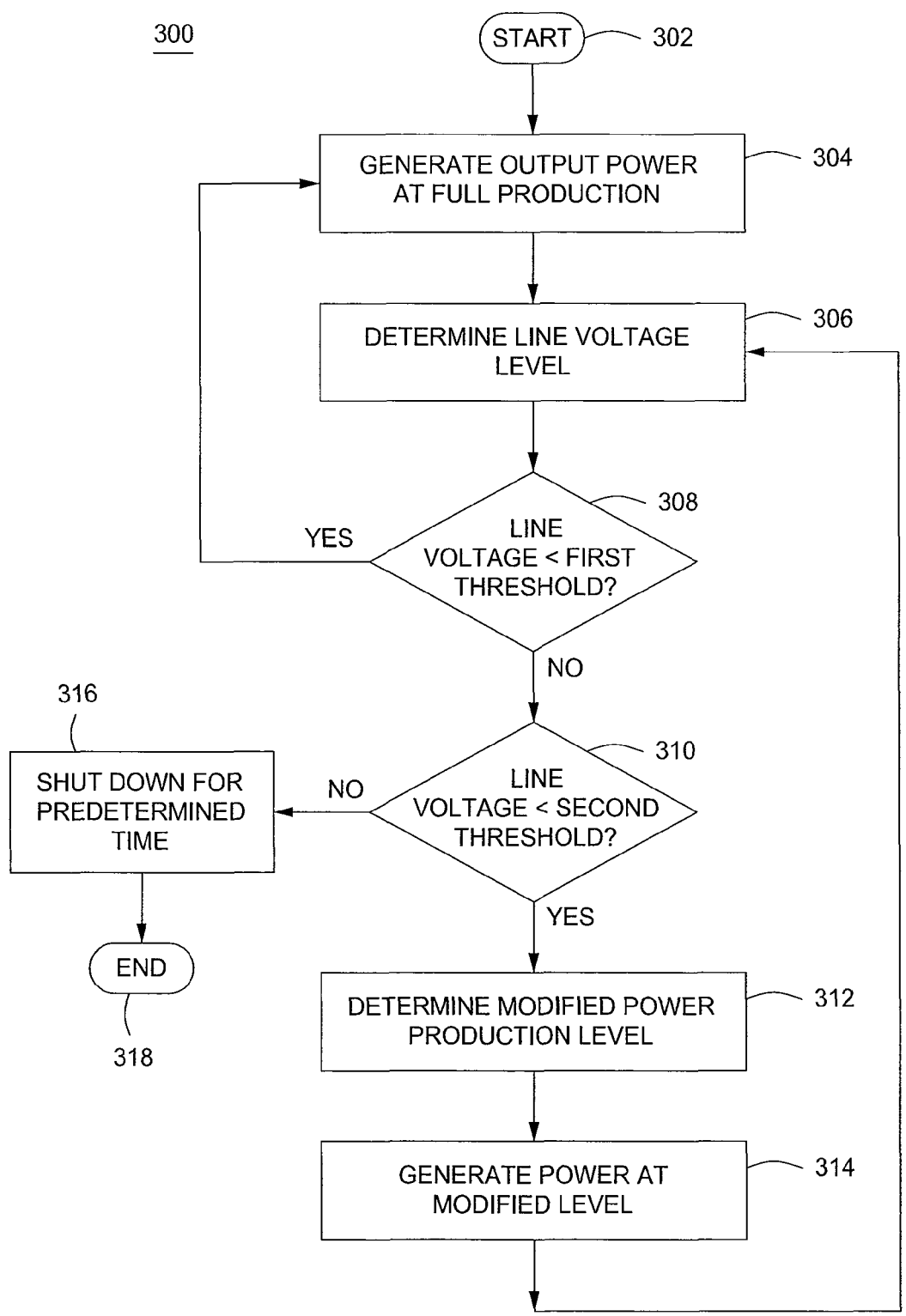
FIG. 3 is a flow diagram of a method for regulating inverter output power in accordance with one or more embodiments of the present invention.

FIG. 3 is a flow diagram of a method 300 for regulating inverter output power in accordance with one or more embodiments of the present invention. The method 300 is an implementation of the power modification module 220.

In some embodiments, such as the embodiment described below, a power conditioning unit (PCU) comprises a photovoltaic module (PV module) coupled to an inverter (e.g., the PCU 106 comprising the PV module 104 and the inverter 102). The PCU is coupled along with one or more other PCUs to a commercial AC power grid via an AC bus for generating AC power and coupling the generated power to the grid (e.g., the string 108 of the system 100). In some other embodiments, one or more PV modules may be coupled to a single inverter (i.e., a centralized inverter). In some alternative embodiments, other types of renewable energy generators may be utilized in addition to or in place of the PV modules, such as wind turbines, hydroelectric systems, or the like.

Although the method 300 is described below with respect to a single inverter, each inverter within the string may operate in accordance with the method 300. In some alternative embodiments, the present invention may be utilized in regulating output power from other types of power conversion modules, such as DC/DC converters.

The method 300 starts at step 302 and proceeds to step 304. At step 304, the inverter receives sufficient input power and the line voltage at the inverter output is at an acceptable level for the inverter to generate output power at full power production (i.e., the maximum allowed power from the inverter is 100% of the rated maximum power out production). At step 306, the line voltage level at the inverter is determined. For example, one or more samples of the voltage on the AC line at the inverter output may be obtained to determine the line voltage level. In some embodiments, such samples may be determined at a rate of 60 Hz by a line voltage sampler (e.g., the voltage sampler 208) coupled to output terminals of the inverter.

The method 300 proceeds to step 308, where a determination is made whether the line voltage at the inverter is less than a first threshold (i.e., the line voltage level is compared to the first threshold). In some embodiments, the line voltage level may be determined and compared to the first threshold every grid cycle, although in other embodiments other rates may be used.

The first threshold is generally a value proximate a maximum allowable line voltage level for a grid-coupled inverter as specified by the relevant regulatory standards. Generally, the first threshold is sufficiently below the maximum allowable line voltage level such that easing power generation will prevent exceeding the maximum allowable line voltage level, while being close enough to the maximum allowable line voltage level to generate as much power as possible (i.e., the first threshold should be at an optimum reaction time point). For example, for a 240V split-phase supply from the grid, a maximum allowable inverter line voltage as defined by standards may be 264.2V and the first threshold may be set at 263V. The first threshold may thus be set at a point at which reaching/exceeding the maximum allowable line voltage level (i.e., the regulatory threshold) is preventable by the least amount of power reduction possible. In some embodiments, the first threshold may be determined analytically and/or experimentally.

If the result of the determination at step 308 is yes, that the line voltage at the inverter is less than the first threshold, the method 300 returns to step 304. If the result of the determination at step 308 is no, that the line voltage at the inverter is not less than the first threshold, the method 300 proceeds to step 310.

At step 310, a determination is made whether the line voltage at the inverter is less than a second threshold (i.e., the line voltage level is compared to the second threshold). The second threshold is generally a maximum allowable line voltage level for a grid-coupled inverter as specified by the relevant regulatory standards. For example, for a 240V split-phase supply from the grid, a maximum allowable line voltage may be 264.2V as specified by the relevant regulatory standards, and the second threshold may be set to such a value.

If the result of the determination made at step 310 is yes, that the line voltage at the inverter is less than the second threshold, the method 300 proceeds to step 312 where a modified power production level for the inverter is determined. In some embodiments, the modified power production level is determined based on a linearly declining ramp as a function of the line voltage level; for example, as the line voltage increases between the first and second thresholds, the modified power production level linearly declines from 100% to 75%. In other embodiments, the modified power production level may be determined based on a different function, such as a function controlled by a minimum power output level, and/or may be decreased to a different minimum power production value. In certain embodiments, power production remains unaltered while it is less than or equal to 75% of the allowed maximum power out; otherwise the modified power production level is obtained by reducing the allowed maximum power out by a fixed amount, such as 7 watts (W). In some such embodiments, the fixed amount for reducing the power out may be determined experimentally; alternatively, the fixed amount may be determined analytically.

The method 300 proceeds to step 314, where the inverter generates output power at the modified power production level. The method 300 then returns to step 306; if the line voltage level drops below the first threshold, the allowed maximum power out may be increased by fixed increments, such as 2 W each grid cycle, up to the rated maximum power out. The amount for increasing the allowed maximum power out may be determined experimentally; alternatively, it may be determined analytically.

If the result of the determination made at step 310 is no, that the AC line voltage is not less than the second threshold (i.e., the AC line voltage exceeds the second threshold), the method 300 proceeds to step 316 where the inverter shuts down power production for a predetermined time period, such as five minutes. The method 300 then proceeds to step 318 where it ends.

The foregoing description of embodiments of the invention comprises a number of elements, devices, circuits and/or assemblies that perform various functions as described. For example, the power modification module is an example of a means for comparing a line voltage level to first and second thresholds and modifying power converter power production by a first modification when the line voltage level is between the first and the second thresholds, and by a second modification when the line voltage level exceeds the second threshold. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is determined by the claims that follow.

The invention claimed is:

1. A method for regulating power production, comprising:
    comparing a line voltage level to a first threshold and a second threshold, wherein the line voltage level is a level of a line voltage at an output of a power converter; and
    modifying power produced by the power converter by (i) a first modification when the line voltage level is between the first and the second thresholds, and (ii) a second modification when the line voltage level exceeds the second threshold.

2. The method of claim 1, wherein modifying the power produced by the first modification comprises reducing the power produced.

3. The method of claim 2, wherein reducing the power produced comprises reducing the power produced as a function of the line voltage level.

4. The method of claim 3, wherein the function is a linear function.

5. The method of claim 1, wherein the first modification comprises reducing allowed maximum power out by a fixed amount when power production is greater than a percentage of the allowed maximum power out.

6. The method of claim 1, wherein the second threshold is based on a regulatory standard limit.

7. The method of claim 1, wherein modifying the power produced by the second modification comprises ceasing power production.

8. An apparatus for generating regulated power, comprising:
    a power converter comprising a power modification module, wherein the power modification module (a) compares a line voltage level to a first threshold and a second threshold, wherein the line voltage level is a level of a line voltage at an output of the power converter, and (b) modifies power produced by the power converter by (i) a first modification when the line voltage level is between the first and the second thresholds, and (ii) a second modification when the line voltage level exceeds the second threshold.

9. The apparatus of claim 8, wherein modifying the power produced by the first modification comprises reducing the power produced.

10. The apparatus of claim 9, wherein reducing the power produced comprises reducing the power produced as a function of the line voltage level.

11. The apparatus of claim 10, wherein the function is a linear function.

12. The apparatus of claim 8, wherein the first modification comprises reducing allowed maximum power out by a fixed amount when power production is greater than a percentage of the allowed maximum power out.

13. The apparatus of claim 8, wherein the second threshold is based on a regulatory standard limit.

14. The apparatus of claim 8, wherein modifying the power produced by the second modification comprises ceasing power production.

15. A system for generating regulated power, comprising:
    a photovoltaic (PV) module; and
    a power converter, coupled to the PV module, wherein the power converter comprises a power modification module, and wherein the power modification module (a) compares a line voltage level to a first threshold and a second threshold, wherein the line voltage level is a level of a line voltage at an output of the power converter, and (b) modifies power produced by the power converter by (i) a first modification when the line voltage level is between the first and the second thresholds, and (ii) a second modification when the line voltage level exceeds the second threshold.

16. The system of claim 15, wherein modifying the power produced by the first modification comprises reducing the power produced.

17. The system of claim 16, wherein reducing the power produced comprises reducing the power produced as a function of the line voltage level.

18. The system of claim 17, wherein the function is a linear function.

19. The system of claim 15, wherein the first modification comprises reducing allowed maximum power out by a fixed amount when power production is greater than a percentage of the allowed maximum power out.

20. The system of claim 15, wherein the second threshold is based on a regulatory standard limit, and wherein modifying the power produced by the second modification comprises ceasing power production.

* * * * *